Figure 1:
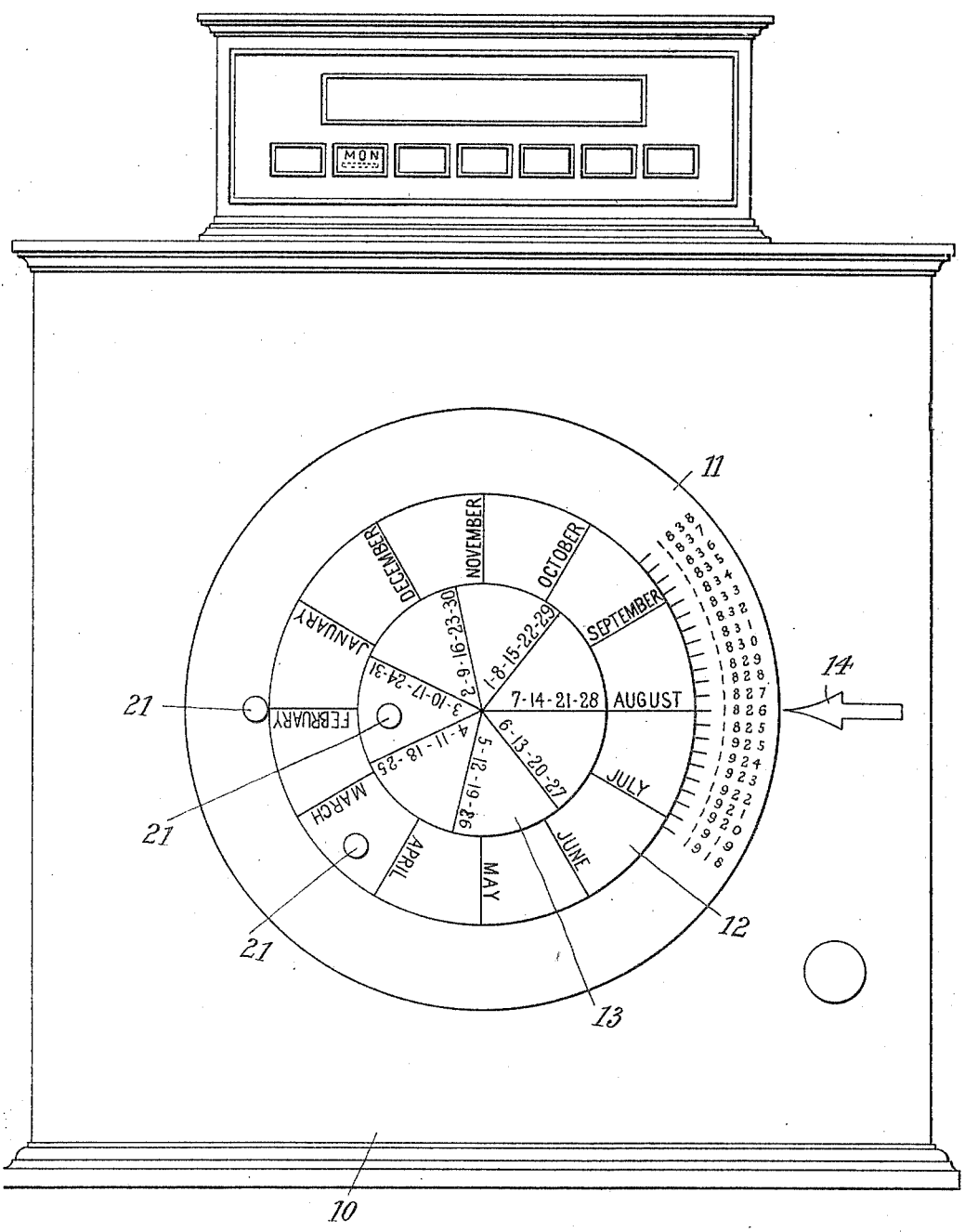

No. 802,346. PATENTED OCT. 17, 1905.
H. M. WILSON.
PERPETUAL CALENDAR APPARATUS.
APPLICATION FILED DEC. 9, 1904.

5 SHEETS—SHEET 1.

No. 802,346. PATENTED OCT. 17, 1905.
H. M. WILSON.
PERPETUAL CALENDAR APPARATUS.
APPLICATION FILED DEC. 9, 1904.

5 SHEETS—SHEET 2.

No. 802,346. PATENTED OCT. 17, 1905.
H. M. WILSON.
PERPETUAL CALENDAR APPARATUS.
APPLICATION FILED DEC. 9, 1904.
5 SHEETS—SHEET 4.
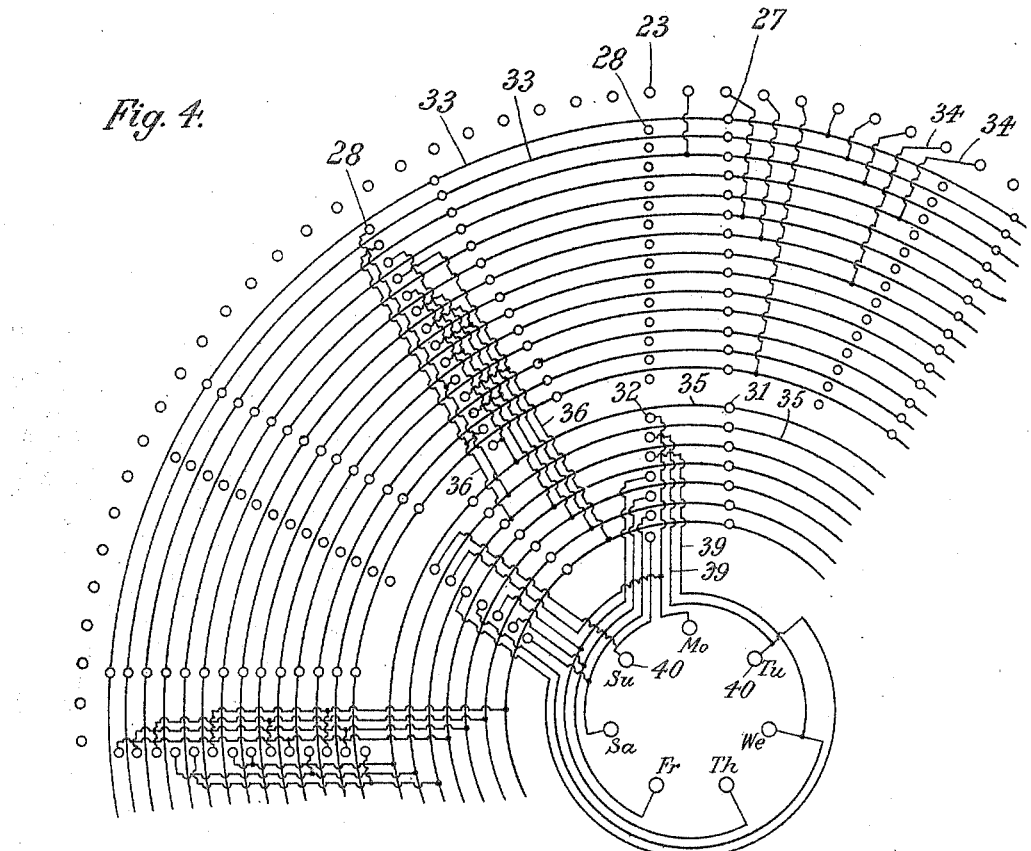
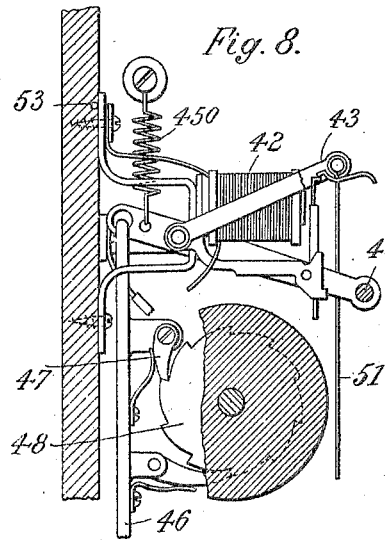
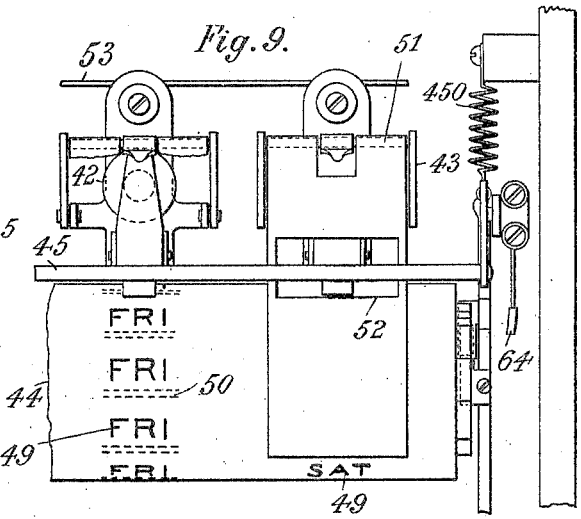

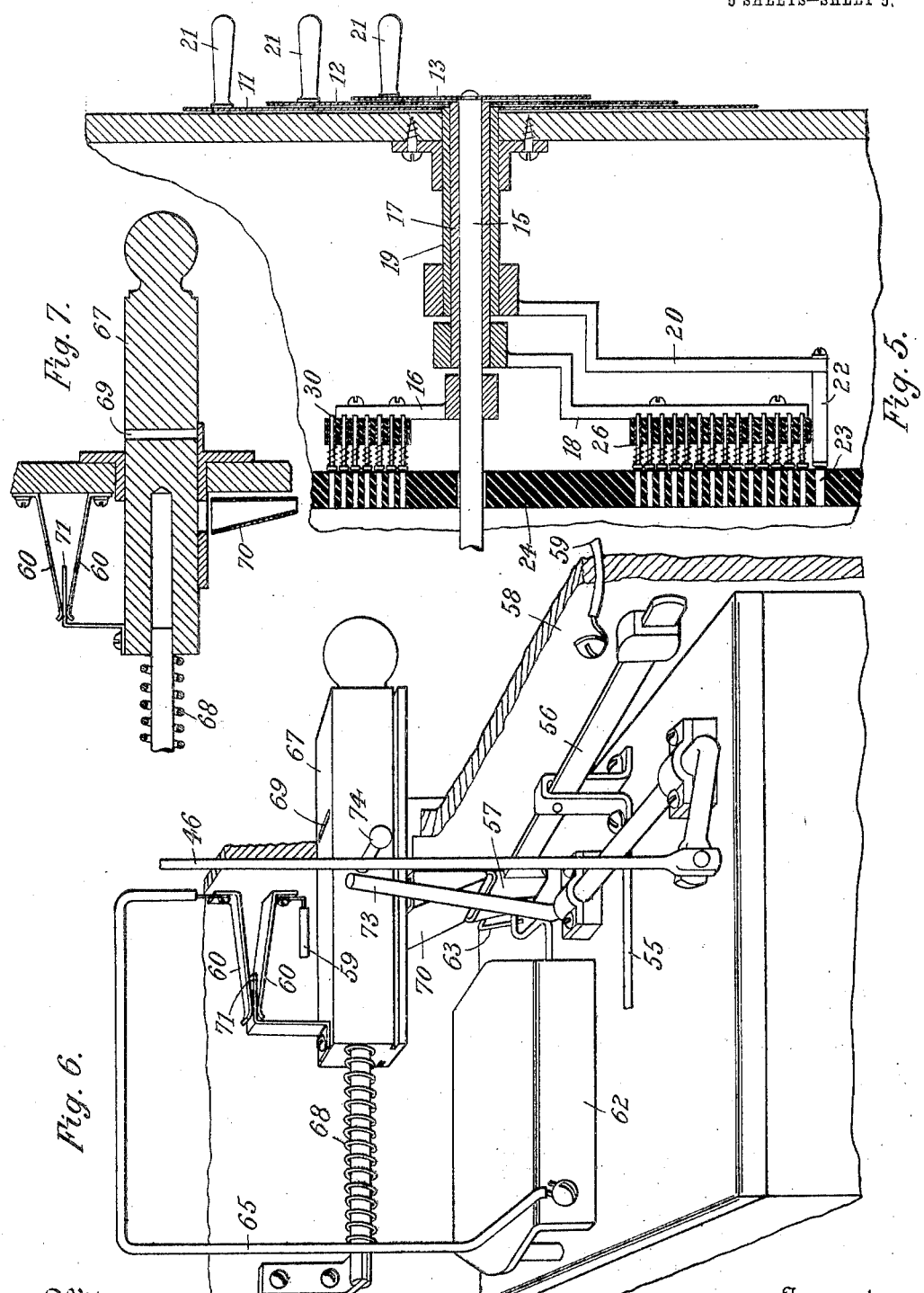

UNITED STATES PATENT OFFICE.

HORACE M. WILSON, OF NEWTON CENTER, MASSACHUSETTS, ASSIGNOR, BY DIRECT AND MESNE ASSIGNMENTS, OF ONE-SIXTH TO WILLIAM G. BEE, OF GLENRIDGE, NEW JERSEY, AND ONE-HALF TO HENRY C. LITTLE, OF BROOKLINE, MASSACHUSETTS.

PERPETUAL-CALENDAR APPARATUS.

No. 802,346.     Specification of Letters Patent.     Patented Oct. 17, 1905.

Application filed December 9, 1904. Serial No. 236,109.

*To all whom it may concern:*

Be it known that I, HORACE M. WILSON, a citizen of the United States, residing at Newton Center, county of Middlesex, State of Massachusetts, have invented certain new and useful Improvements in Perpetual-Calendar Apparatus, of which the following specification and accompanying drawings illustrate one form of the invention which I now regard as the best out of the various forms in which the invention may be embodied.

This invention relates to perpetual or universal calendar apparatus wherein mechanical operations are applied to the ascertainment of the information conveyed by the calendar.

Various arrangements of the universal calendar have been devised wherein the operation of ascertaining the day of the week corresponding to a given date is in the main mental, and it has also been proposed to combine a physical operation, such as the movement of a slide with the mental operations, whereby, for example, the whole calendar for any given year may be exposed to the exclusion of other years. In a copending application, Serial No. 181,577, I have shown a universal-calendar apparatus, coin-controlled, in which the operations are mostly mechanical and visual, and the memory is called upon in a smaller degree than heretofore in obtaining the information available.

The present invention is an improvement on my aforesaid invention and application; and its objects are to still further reduce the mental operations required, to simplify the mechanical operations, and to simplify the mechanical construction.

A further object is to impart information additional to that pertaining exclusively to a calendar—as, for example, to tell a "fortune"—and to vary this information or fortune for different observers, even though the week-day disclosed to those observers should be the same.

In the specific embodiment herein shown the connections whereby the actuating and indicating devices are prearranged according to the universal calendar are electrical, as in my aforesaid application, although, broadly, the invention would also extend to strictly mechanical connections. I introduce a year-indicator having the years consecutively arranged, and thus reduce the mental operations required in setting the apparatus according to the year desired. The indicator-switches for the years, months, and month-days are formed by a series of fixed contacts and revolving contacts common to all of the fixed contacts, the whole constituting selectors, so that indicators may be employed including the years, months, and month-days, circularly arranged and revolving relatively to a pointer. Either the pointer or the series of designations may revolve; but I prefer the latter, as this makes it feasible to arrange all three indicators concentrically. The operation of the apparatus, then, briefly, consists in setting the indicators for the year, month, and month-day and then completing an electric circuit extending through the three selecting devices, so as to cause the actuation of an annunciator-drop which reveals the day of the week corresponding to the selected date.

Figure 2:
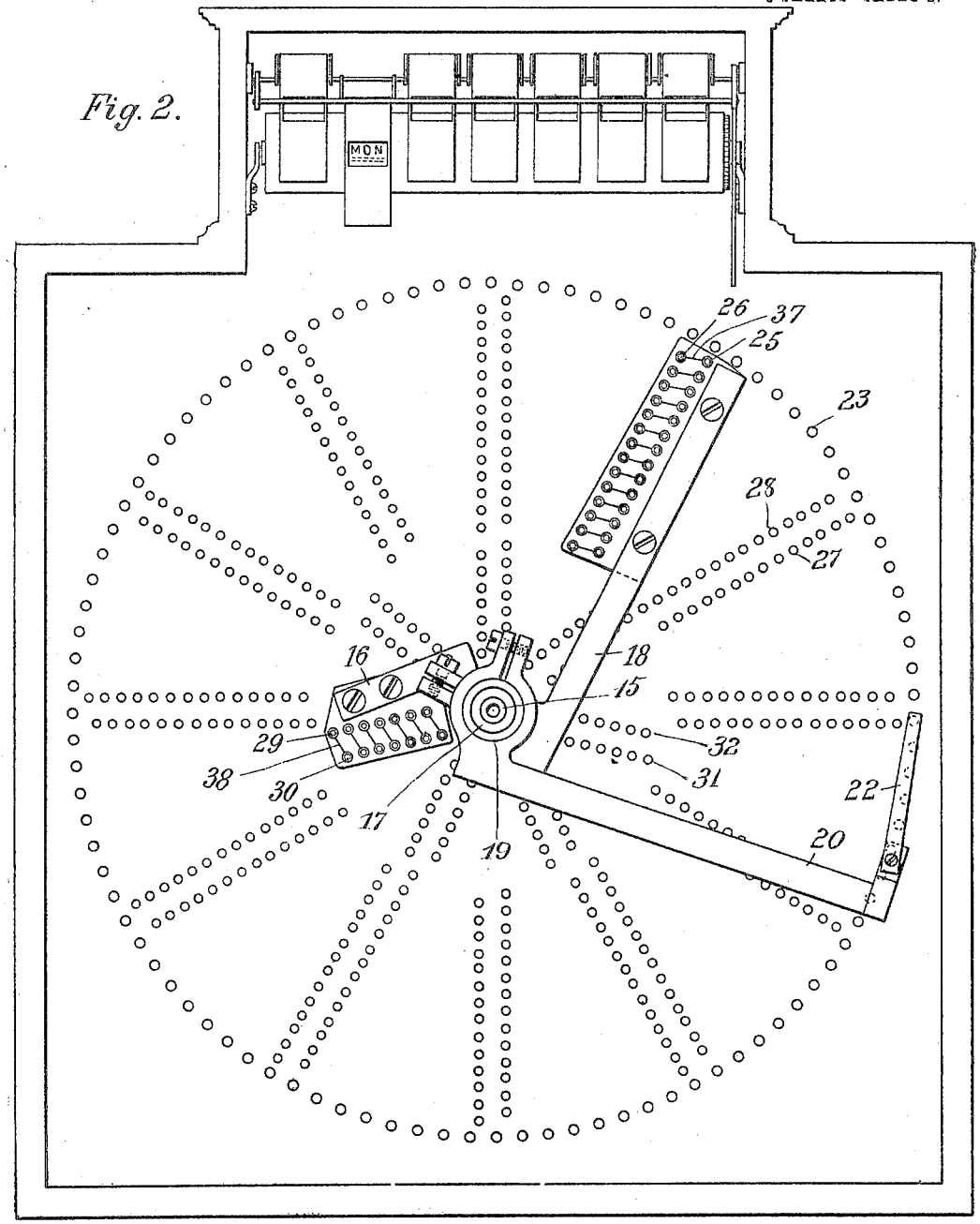
Figure 3:
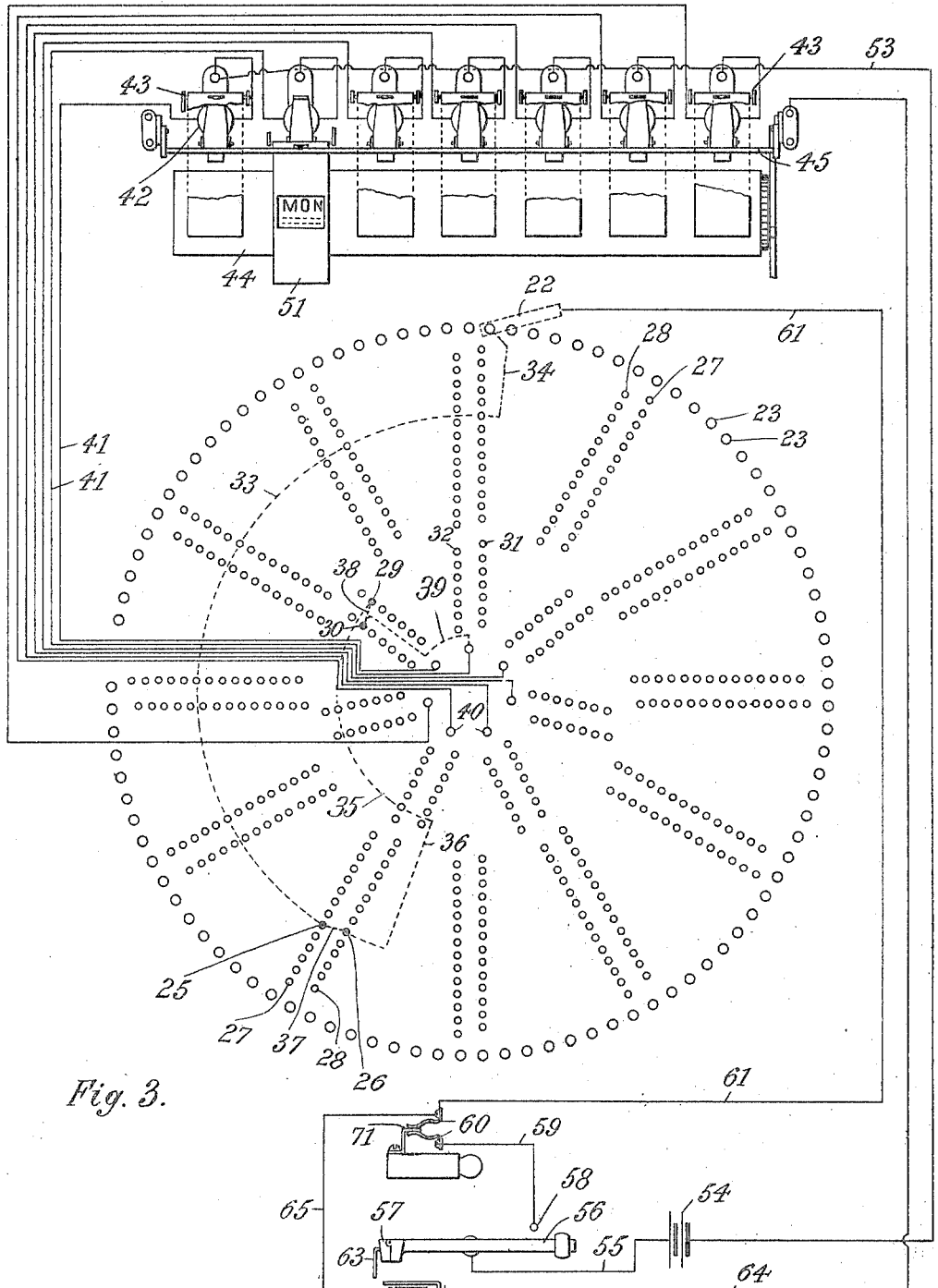

In the accompanying drawings, Figure 1 represents a front elevation of a universal-calendar apparatus constructed according to my invention in its outside aspect. Fig. 2 represents a front elevation with the front of the casing and dials removed. Fig. 3 represents a diagram of certain of the circuits and shows one complete circuit. Fig. 4 represents an enlarged diagram, showing part of the wiring on the back of the switch or selector board. Fig. 5 represents an axial section of the dials, revolving brush-holders, and a part of the selector-board. Fig. 6 represents a perspective view of the coin-controlled device. Fig. 7 represents a section through the coin-slide. Figs. 8 and 9 represent, respectively, an end elevation and a front elevation of the annunciator-drops and related parts.

The same reference characters indicate the same parts in all the views.

In the drawings, 10 is a casing on front of which are three concentric dials 11 12 13 for the years, months, and month-days, respectively. On the smallest or inner dial 13 (reckoning radially) are seven groups of numerals circularly arranged and indicating the days of the month. On the second or wider dial 12 are marked the months of the year, consecutively arranged around the circumference of the dial, and on the third or widest dial 11 are marked the years, there being here shown the years from 1825 to 1925, inclusive.

14 is a fixed pointer on the casing, opposite which the desired year, month, and month-day are brought when it is required to find the corresponding week-day.

The three dials in combination with the pointer 14 constitute three indicators, of which the pointer is an element common to all.

The smallest dial 13 is attached to a shaft 15, carrying a revolving arm or brush-holder 16 at its inner end. The middle dial 12 is attached to a sleeve or hollow shaft 17, carrying at its inner end a second arm or brush-holder 18. The outer dial 11 is attached to a concentric sleeve 19, surrounding the sleeve 17 and carrying at its inner end a third revolving arm or brush-holder 20. The three dials are provided with knobs or handles 21, whereby they may be revolved, causing the brush-holders to revolve correspondingly. The longest or year brush-holder 20 carries a single contact-brush 22, coöperating with a circle of fixed differentiated contacts 23, mounted upon an insulating selector-board 24 and representing the years. The intermediate brush-holder 18 carries fourteen pairs of contact-brushes 25 26, coöperating with fourteen circular sets or groups of fixed contacts 27 28, mounted upon the board 24. The month-day brush-holder 16 carries seven pairs of contact-brushes 29 30, coöperating with seven circular sets or groups of fixed contacts 31 32, mounted upon the board 24. The outer brush 22 and contacts 23 constitute the year-selector, the middle brushes and contacts 25 26 27 28 constitute the month-selector, and the inner brushes and contacts 29 30 31 32 constitute the month-day selector. Preferably the apparatus embodies these three selectors, as shown; but any one of these selectors is believed to constitute a novel instrumentality in a calendar apparatus, and therefore the invention would not be departed from by performing the functions of or setting out the calendar prior or subsequent to any one of them by other means or even leaving this to the mental processes of the user.

In the middle or month selector there are twelve radial groups of the contacts 27 28, corresponding to the twelve months, and each radial group consists of two radial rows. Each circular group of contacts 27 28, comprising twenty-four contacts, represents a typical year, and the contacts 27 are connected by fourteen trunk-wires 33, to which the year-contacts 23 are connected by branch wires 34, there being a plurality of years connected to each trunk-wire. The connections of the contacts 28 in any circular group differ from each other, and hence I term these "differentiated" contacts. The trunk-wires 33 and contacts 27 are equivalent to continuous collector-rings. When the brush 22 is on any contact 23, it is therefore connected with some particular trunk-wire 33 and all the contacts 27 thereon and with no other trunk-wire in the month-selector.

The contacts 31 32 of the inner or month-day selector are divided into seven radial groups, each composed of two radial rows, and the contacts 31 are connected by trunk-wires 35, which, together with contacts 31, are the equivalent of collector-rings. These trunk-wires are connected by branch wires 36 with the contacts 28 of the month-selector, each trunk 35 having a plurality of contacts 28 connected with it.

The pairs of brushes 25 26 on the month brush-holder 18 are electrically connected by suitable bonds 37, and the pairs of brushes 29 30 are connected by similar bonds 38, so that when the groups of brushes coincide with the radial groups of contacts all of the pairs of contacts 27 28 and 31 32 for one radial group in each selector will be connected across.

In the month-day selector the differentiated contacts 32 are connected by branch wires 39 with seven junction-points 40, from which seven trunk-wires 41, Fig. 3, lead to the electromagnets 42 of a corresponding number of pivoted annunciator-drops 43, which pertain to the several week-days. The designations for the week-days are printed on a cylinder 44, and when any drop is released by the energizing of its magnet the corresponding week-day designation shows through the front of the apparatus, as indicated in Figs. 1, 2, and 3.

45 is a resetting-bar adapted to reset the drops and elevated by depressing a rod 46, actuated by the coin-slide, as hereinafter described. This rod has a pawl 47 engaging the teeth of a ratchet 48 on the end of cylinder 44, whereby said cylinder is rotated one step every time the pusher is actuated.

For every week-day I print the designation 49 of that day several times around the periphery of the cylinder and underneath the same a corresponding number of designations 50, each of which may be a motto or fortune different from the rest. When any drop is actuated, the designation of the week-day appears and also the motto or fortune; but a different motto or fortune will show to several successive observers for the same day. Each drop has a curtain or shield 51, with an aperture 52 therein of sufficient size to expose one week-day designation and the corresponding motto or fortune, said aperture being out of register with the aperture in the front of the casing when the drop is raised, but registering therewith when the drop is depressed.

The remainder of the electrical connections and the coin-controlled devices are as follows: The circuits of the annunciator-magnets 42 are continued through the frames of the magnets and connect by a common return-wire 53 with one side of a battery 54. From the other side of said battery leads a wire 55, going to the pivot of a lever 56, having a coin-bucket 57 at one end and counterweighted at the other end, the said lever when oscillated by a coin connecting with a contact 58. This in turn connects by a wire 59 with one of a pair of spring-contacts 60, the other of which connects by a wire 61 (which may partly represent certain of the metallic parts of the machine) with the year-brush 22. A parallel circuit extends by way of lever 56, contacts 58 and 60, and wire 65 through a trembler 62 for actuating a valve or gate 63 on the coin-bucket to release the coin and through a wire 64 to the resetting-bar 45. The object of this parallel circuit is to release the coin and allow the coin-bucket to return and break the main circuit after the drop has fallen.

67 is the coin-slide pushed inwardly by the operator and outwardly by a spring 68, said slide having a coin-slot 69 adapted when the slide is pushed in to register with a chute 70, through which the coin reaches the coin-bucket 57. The slide 67 carries a contact 71, inserted between the spring-contacts 60 when the slide is in its outermost position. A rock-lever 73, engaged by a pin 74, projecting from the slide, depresses the rod 46 and elevates the resetting-bar 45 when the slide is pushed in, said bar being returned by a spring 450 when the slide is released. When any drop 43 falls, a circuit is completed between it and the resetting-bar 45.

The operation of the machine is performed by first setting the dials 11 12 13 to indicate, in conjunction with the pointer 14, the year, month, and month-day selected. This will bring the several brushes 22 25 26 29 30 upon certain predetermined contacts in the three selectors. It has been stated that the fourteen rows of contacts 27 28 in the month-selector represent fourteen typical years, in accordance with a well-known attribute of the universal calendar. Seven of these are common years and seven leap-years, and any year in the Christian reckoning from 1752 onward can be referred to these typical years. Thus the outermost row corresponds to the years 1829, 1835, 1846, 1857, &c., and its trunk-wire 33 is connected to the contacts 23 corresponding to these years. The calendar for all of these years is the same—that is, the dates of these years fall on the same week-days. When the month brush-holder 18 is revolved, only one pair of its brushes 25 26 can carry current, because only the one corresponding trunk-wire 33 is in connection with the wire 61. In any one typical year of the universal calendar there are seven possible typical months—that is, the days of the month can fall on weekdays according to seven different arrangements. These typical months are represented by the trunk-wires 35 of the month-day selector, and according to the rotative position of the brush-holder 18 of the month-selector one or another of these trunk-wires will be placed in connection with the wire 61 through the corresponding branch wire 36, contact 28, and pair of brushes 26 25, which are then active. Thus we will say that when the sixth circle of contacts 27 28 from the outermost one is active, as shown in Fig. 3, August must correspond to the next to the outermost trunk-wire 35 of the month-day selector, for the reason that the sixth contact 28 of the radial group corresponding to this month is connected to the aforesaid second wire 35. As in the month-selector, so in the month-day selector, there is only one circular row of contacts 31 32 active at any one time, because only one brush 26 can be active. As before stated, the contacts 32 are permanently connected, through the trunk-wires 31 with the magnets of the annunciator-drops 42. We will say that when the month-day dial 13 is in position to bring its brush-holder 16 in coöperation with that radial group of contacts 31 32 to the left of the uppermost one, as shown in Fig. 3, the seventh, fourteenth, twenty-first, and twenty-eighth days of the month will be indicated. For the second trunk-wire 35 the corresponding contact 32 is connected with the Monday drop, as denoted in Fig. 3. The contacts 32 for any one circumferential row connect with different days of the week in the several radial groups of the month-day selector, so that any one circumferential row of contacts 31 32 being active the annunciator will show different days of the week according to the rotatory position of the dial 13. The above arrangement of circuits is in accordance with the universal calendar and is such that the year-dial 11 having been set as desired one of fourteen typical years will be selected on the middle selector, and in this typical year the dates of the seven typical months must fall upon different predetermined week-days. The typical month having been selected in the radial group by movement of the middle dial 12, a certain circumferential group is thereby selected in the innermost selector, and in this group the contacts 32 are connected with the different annunciator-drops, and a certain day of the week will be shown, according to the position of the inner dial 13. The dials having been set, a coin is deposited and the slide 67 pushed in, whereupon the coin falls into the bucket 57 and oscillates lever 56. Upon release of the slide a circuit is completed through one of the drop-magnets. One such circuit is shown in Fig. 3 for the seventh, fourteenth, twenty-first, and twenty-eighth days of August, 1826. The circuit is as follows: from battery 54 through wire 55, lever 56, contact 58, wire 59, contacts 60 71, wire 61, brush 22, contact 23, and branch wire 34 to one of the trunk-wires 33, from thence through corresponding contact 27, brush 25, bond 37, brush 26, contact 28 and branch wire 36 to one of the trunk-wires 35, from thence through the corresponding contact 31, brush 29, bond 38, brush 30, contact 32, and branch wire 39 to the trunk-wire 41, leading to the "Monday" drop of the annunciator, and from thence through the drop-magnet 42 and wire 53 back to the battery 54. The falling of the said drop closes a parallel circuit from the wire 61 through trembler 62, wire 64, resetting-bar 45, drop 42, and magnet-frame to the wire 53, whereby the coin is released and the lever 56 allowed to return. This breaks both the main circuit and the trembler-circuit, and the two cannot again be energized until a coin has been deposited and the slide pushed in and then released. The pushing in of the slide elevates the bar 45 and restores any drop which has fallen in a previous operation.

What I claim as new, and desire to secure by Letters Patent, is—

1. In a universal-calendar apparatus, the combination of a year-indicator marked with years consecutively arranged and having an adjustable indicating member, a series of indicating devices of a lower order of divisions of time, and means whereby the adjustment of said indicating member associates the first said indicator with said devices in different arrangements according to the universal calendar.

2. In a universal-calendar apparatus, the combination of a series of rotary indicators marked with different orders of divisions of time, a series of week-day indicators, and connections having a predetermined arrangement in accordance with the universal calendar whereby the adjustment of said rotary indicators renders operative different ones of said week-day indicators corresponding to the position of said rotary indicators.

3. In a universal-calendar apparatus, the combination of a series of concentric indicators marked with different orders of divisions of time, a series of week-day indicators, and means whereby the adjustment of said concentric indicators renders different ones of said week-day indicators operative in accordance with the universal calendar.

4. In a universal-calendar apparatus, the combination of three rotary dials of different diameters marked with years, months and month-days respectively and having concentric shafts, selectors controlled by said shafts, a series of indicating devices, and means whereby an operative connection is established through said selectors to different ones of said indicating devices according to the adjustment of the dials.

5. In a universal-calendar apparatus, the combination of three rotary dials of different diameters marked with years, months and month-days respectively and having concentric shafts, brushes mounted on said shafts, contacts controlled by said brushes, and indicating-circuits controlled by said contacts and brushes and arranged according to the universal calendar.

6. In a universal-calendar apparatus, the combination of a series of indicating devices, a manually-adjustable indicator marked according to divisions of time, a selector coadjustable with said indicator, and means whereby a continuous operating connection is established through the selector to the different indicating devices according to the adjustment of said indicator.

7. In a universal-calendar apparatus, the combination of a series of indicating devices, a series of manually-adjustable indicators marked with different orders of divisions of time, selectors coadjustable with said indicators, and means whereby a continuous operating connection is established through the selectors to the different indicating devices according to the adjustment of said indicators.

8. In a universal-calendar apparatus, the combination of a selector comprising circularly-arranged contacts, a revolving brush coöperating therewith, and a series of week-day indicators controlled by said selector.

9. In a universal-calendar apparatus, the combination of a selector comprising circular groups of contacts, each group composed of differentiated contacts and a trunk-circuit, a series of pairs of brushes corresponding in number to the groups and adapted to connect the differentiated contacts and trunk-circuit of each group, and indicating-circuits controlled by said selector.

10. In a universal-calendar apparatus, the combination of a series of indicating-circuits, and a selector controlling the same and comprising contacts arranged in circular and radial groups and a radial group of brushes adapted to successively coöperate with the radial groups of contacts, an indicator having designations of divisions of time corresponding to the radial groups of contacts and a revolving indicating member connected with the brushes.

11. A series of adjustable electric selectors pertaining to different orders of divisions of time, a series of indicating devices, and means whereby a continuous circuit is established through said selectors and a predetermined one of the indicating devices by a predetermined adjustment of said selectors.

12. A series of electric selectors pertaining to different orders of divisions of time and comprising fixed contacts and revolving brushes, the contacts of any selector pertaining to a higher order being connected with the brushes of the selector pertaining to the next lower order, and indicating-circuits controlled by said selectors.

13. In a universal-calendar apparatus, the combination of an adjustable month-day selector, a series of week-day-indicating devices, and means whereby an electric circuit is established between said selector and a predetermined one of said devices according to the adjustment of said selector.

14. In a universal-calendar apparatus, the combination of a series of week-day-indicating devices, adjustable month-day and month selectors, and means whereby a continuous electric circuit is established through said selectors and a predetermined one of said devices according to the adjustment of said selectors.

15. In a universal-calendar apparatus, the combination of a series of week-day-indicating devices, adjustable month-day, month and year selectors, and means whereby a continuous electric circuit is established through said selectors and a predetermined one of said devices according to the adjustment of said selectors.

16. A series of seven annunciator devices denoting week-days, a month-day selector having contacts arranged in radial groups corresponding to the month-days and in seven circular groups, each circular group comprising a series of differentiated contacts connected respectively to the several annunciator devices and a trunk-circuit common to its differentiated contacts, the differentiated contacts in the radial groups having connection with different ones of the annunciator devices, a rotary month-day indicator having seven sets of brushes to connect the trunk-circuit and differentiated contacts in each circular group for one radial group at a time, a month-selector having contacts arranged in radial groups corresponding to the months and in fourteen circular groups, each circular group comprising a series of differentiated contacts connected with different ones of the said trunk-circuits, and one of a second series of trunk-circuits common to the differentiated contacts, the differentiated contacts in the radial groups having connection to different ones of the first said trunk-circuits a rotary month-indicator having fourteen sets of brushes to connect the trunk-circuit and differentiated contacts in each circular group of said month-selector for one radial group at a time, and a year-selector having a circular series of contacts corresponding to the years and connected to different ones of the second series of trunk-circuits and a rotary indicator having a brush coöperating with said year-contacts and in circuit with the annunciator devices.

17. In a universal-calendar apparatus, the combination of a series of devices for indicating the days of the week and other information, means for individually actuating said devices, and means whereby the week-day indication is repeated and the other information varied throughout a series of actuations of any of said devices.

18. In a universal-calendar apparatus, the combination of a repeating-indicator having designations of divisions of time, an annunciator device having provisions for revealing and concealing the information on said indicator and calendar mechanism having designations of a different order of divisions of time controlling said device.

19. In a universal-calendar apparatus, the combination of a series of rotary indicators corresponding in number to the days of the week and each marked with a circular series of designations of a week-day, and different information adjacent the several designations on any indicator, a series of annunciator devices having shields normally concealing the information on said indicators, means for individually actuating said annunciator devices, and means whereby the operation of the annunciator devices advances the indicators step by step.

20. In a universal-calendar apparatus, the combination of a series of week-day-indicating devices having means for imparting additional information, manually-actuated indicators of higher orders of divisions of time, related to the week-day indicators according to the universal calendar, and means whereby successive actuations of any week-day-indicating device varies the additional information imparted thereby.

In witness whereof I have hereunto set my hand, before two subscribing witnesses, this 5th day of December, 1904.

HORACE M. WILSON.

Witnesses:
L. L. Shaw,
M. T. Moder.